United States Patent
Rosen

(10) Patent No.: US 7,918,406 B2
(45) Date of Patent: Apr. 5, 2011

(54) OVERRIDE OF NONOCCUPANCY STATUS IN A THERMOSTAT DEVICE BASED UPON ANALYSIS OF RECENT PATTERNS OF OCCUPANCY

(76) Inventor: Howard Rosen, Montreal (CA)

( * ) Notice: Subject to any disclaimer, the term of this patent is extended or adjusted under 35 U.S.C. 154(b) by 442 days.

(21) Appl. No.: 12/177,822

(22) Filed: Jul. 22, 2008

(65) Prior Publication Data
US 2010/0019051 A1 Jan. 28, 2010

(51) Int. Cl.
G05D 23/00 (2006.01)
(52) U.S. Cl. ........ 236/46 R; 236/51; 236/91 C; 165/237
(58) Field of Classification Search ................ 236/1 C, 236/46 C, 46 R, 51, 91 C; 165/237
See application file for complete search history.

(56) References Cited

U.S. PATENT DOCUMENTS 5,261,481 A * 11/1993 Baldwin et al. .............. 165/237
5,476,221 A * 12/1995 Seymour ....................... 236/47
6,196,468 B1 * 3/2001 Young .......................... 236/46 R
2008/0283621 A1 * 11/2008 Quirino et al. ............... 236/1 C

* cited by examiner

Primary Examiner — Marc E Norman
(74) Attorney, Agent, or Firm — Marc E. Hankin; Kevin Schraven; Hankin Patent Law, A.P.C.

(57) ABSTRACT

A thermostat system with a thermostat control program is disclosed for controlling a Heating Ventilation and/or Air Conditioning (HVAC) system which incorporates a mechanism for detecting activity or occupancy in a room, area or conditioned space served by the HVAC system. The thermostat control program analyzes levels, counts or other aspects of activity detected in the conditioned space, with an operating sequence which may include pattern recognition techniques. The operating sequence of the thermostat control program may further depend upon time of day, and upon periods of time identified as being periods for special handling of occupancy, or the recognition of occupancy. These factors may then be utilized by the thermostat control program to influence determination of the temperature setpoint, or to select from alternative programming provided either by the user of the thermostat, or by factory programming, with purpose of balancing energy savings and comfort.

17 Claims, 3 Drawing Sheets

OVERRIDE OF NONOCCUPANCY STATUS IN A THERMOSTAT DEVICE BASED UPON ANALYSIS OF RECENT PATTERNS OF OCCUPANCY

BACKGROUND OF THE INVENTION

This invention relates to the art of environmental control systems, to the art of thermostats which control heating, ventilation and cooling systems, and more particularly to those thermostats which incorporate a motion detector or occupancy sensor. Additional related fields of art include electric heating, electric heaters, electric baseboard heaters, air-conditioning system control, thermostats, energy conservation, energy management, motion detectors, and occupancy sensors. Heating Ventilation and/or Air Conditioning systems are commonly referred to as HVAC units, or just HVAC.

Energy usage for environmental control, especially for heating or cooling, is a major expense in many homes and businesses. Even minor changes in environmental control procedures can result in significant energy savings. Typical approaches for saving energy include such procedures as manually turning off a heating or cooling system when a room is not used, or reducing the level of heating or cooling based upon some algorithm of programmed control in a thermostat. It is common for example in thermostats intended for home use to provide programmable features allowing for temperature settings that are dependent upon the time of day, and also upon the day of the week with the desired temperature being set based upon the user's prediction of needs for heating or cooling, or possibly to shift energy usage to a time of day or day of the week when energy costs are lower.

Designers of thermostats have also incorporated an occupancy sensor, or provided for input from an occupancy sensor to inform the controlling mechanism for a thermostat when the conditioned space served by space conditioning equipment (a heating, cooling, and/or ventilation system) is "unoccupied" meaning that no people (or animals) are detected, presumably in the conditioned space, by the occupancy sensor. Occupancy sensors can be implemented using various types of motion detectors, such as infrared motion detectors, or could be implemented with other mechanisms for sensing presence of a person in a room, or for sensing entry of a person into a room or conditioned space. The mechanism for sensing occupancy may however not be perfectly accurate. That is, a person may be in the conditioned space served by a heating, cooling or ventilation system, and potentially not be detected by an occupancy sensor, or at least not detected for some period of time. This might be caused by a chosen mechanism for sensing occupancy which is not sensitive enough, or a person might be hidden from the "view" of the occupancy sensor. For example, in a motel room with a single thermostat incorporating a single occupancy sensor, a person might remain undetected if he were in the bathroom or had positioned himself such than an object was between him and the occupancy sensor. If this situation continued for some extended period, the mechanism for determining occupancy might decide the room was unoccupied when in reality it actually was occupied. Various scenarios that might cause an error such as this might be possible.

In a motel room it is desirable to conserve energy while still providing for comfort throughout the day and night. If a heater or air-conditioner were erroneously turned off, it could possibly cause discomfort to a guest, especially at night when the temperature might become quite uncomfortable before the guest awakes enough to correct it. In a motel room, even just mild discomfort might be something that is quite undesirable to the business.

The possibility of wrongly determining a nonoccupancy condition might occur more often during certain periods of the day. For example, at night when a person is sleeping very soundly, the person might not move for an extended period and it would become more likely to remain undetected by the occupancy sensor. This condition, for example, might be determined by the motel operator to be much more likely to happen at night, such as when a person is covered by blankets which might hinder a motion detector from sensing movement.

BRIEF SUMMARY OF THE INVENTION

Therefore, there is a need for a mechanism that reduces, during certain identified periods of time, the chance of wrongly turning off a heating, cooling, or ventilation system due to a missed signal of occupancy, or due to a prolonged period of inactivity by an occupant, while still allowing for energy savings made possible by general utilization of a motion detector or occupancy sensor.

The present invention provides an improved thermostat apparatus incorporating an occupancy sensor with a simple method for programming the thermostat such as to reduce the chance, during certain time periods, of erroneously turning off, or erroneously reducing the level of heating or cooling, while still achieving energy savings.

In accordance with the teachings of the present invention an illustrated embodiment of the invention may include an input screen for describing to a control program of the thermostat a period of "safety time" during which it is desired to reduce the chance of erroneously determining nonoccupancy and then following any programmed results of that determination. The period of safety time might be one period of time each day, or provision for multiple periods of safety time in a day might be provided. The timing of the defined safety time periods might also be dependent on the day of the week, such as having longer periods of time utilized on weekends, or maybe on a Friday night. The safety periods or intervals might also be defined to be dependent upon the season of the year, a measurement of outside temperature, or other similar conditions as might be defined by one skilled in the art. During these safety periods or intervals it is desirable to enhance the process for recognizing nonoccupancy so that energy savings can be achieved while still providing for adequate levels of heating or cooling under varying patterns of occupancy that may be somewhat unpredictable, difficult to detect or difficult to analyze.

Assuming that a thermostat with a thermostat control program is following a "normal" control sequence, and it is determined that the "current" time is now within a described safety period such that it is desired to reduce the chance of possible occupancy detection error, then it may be desirable to invoke an approach with less likelihood of error, and to retain that approach until time passes such that the described period has passed, or some other exception condition is detected or occurs. After the safety period has passed, the thermostat control process may then resume its more normal control sequence, and continue in that manner until another described period of safety is reached. Exception conditions during the safety period may of course require an alteration of the sequence to handle other events or to branch to other control sequences as might be defined by one skilled in the art.

It is noted that the use of the word "safety" as in "safety period" in describing a time period or interval is not intended to be limiting to a description of physical safety, or potential harm. "Safety" is meant to be a broad term including also safety from discomfort due to a conditioned space temperature setting being not as might be desirable, or even "safety" from an inconvenience such as having to wave one's arm to activate the occupancy sensor. A safety period might also describe periods of time during a day in which activity in the conditioned space might be ignored, or have the effects of occupancy minimized. This might be useful, for example, for saving energy by not assuming any extended occupancy during periods of time when it is likely that housecleaning, or maintenance personnel are likely to be in a motel room. Other periods of the day might be predicted to have only short term occupancy and it would be advantageous to save energy by returning quickly to a condition of no occupancy relatively quickly after activity in a room ceases. In the general sense the words "safety period" might be better described as an "enhanced control period".

As an example of a situation in which an illustrated embodiment of the invention could achieve energy savings while still reducing the chance of erroneously determining a condition of nonoccupancy, the following scenario is described. A motel room is equipped with a thermostat that incorporates an occupancy sensor. In an attempt to be sure that guests are comfortable all night, it is decided to program the thermostat and provide a "safety period" so that the occupancy sensor is disabled from 6:00 p.m. until 6:00 a.m. each night, meaning that the occupancy sensor is ignored and the room is assumed by the control program to be occupied during that time period. This simplistic approach may waste considerable energy, especially if there is no one in the room at all during most of that "safety" period. To allow for a better possibility of energy savings, a further consideration may be provided in the programming. That is to allow for nonoccupancy to be an assumed condition at the start of the safety period, and then if any activity is detected after the start of the safety period to assume occupancy and "maintain" a condition of occupancy until the end of the safety period. This at least requires that the person be detected briefly before assuming occupancy and would save energy if the room were completely unoccupied. This approach however is also simplistic and likely to waste energy as for example when a person enters the room briefly during the safety period, and then departs for a significant amount of time before returning.

For example, a typical scenario of room usage in a motel might be where a guest enters the room at 6:15 p.m. which is during the exemplary "safety period," changes clothes and then goes out to dinner and a movie at 6:45 p.m. then returning to the room at midnight. If occupancy is assumed throughout that entire period, the room is needlessly heated or cooled from 6:45 p.m. until midnight. An improvement in the illustrated embodiment is to provide an alternative method for occupancy detection once the safety period begins. The method would provide for the thermostat control program to try to predict whether a person is in the room "for the night" or "just passing through". The illustrated embodiment incorporates an exemplary method for this altered occupancy detection during the safety period which samples for occupancy every half hour, and only if the room is occupied for three consecutive samples, is the condition of occupancy "extended" until the end of the safety period. Another possible algorithm is to extend occupancy only if the room is "continuously" occupied for a time period such as one hour. The precise values for the length of the time periods and the exact requirements for triggering the extension of the safety period could be varied as might be determined by one skilled in the art.

It is noted that occupancy sensors typically incorporate or utilize a motion detector, which might be an infrared motion detector. The motion detector provides an "instantaneous" signal of activity, that is, when a person moves, the motion detector is triggered, but when the person stops moving for a brief period, the motion detector may stop signaling motion. A simple condition of occupancy or "recent activity" in the room may require some "smoothing" of a signal from a motion detector such that "occupancy" is maintained for a defined period after any motion is detected. This can be considered a "hysteresis" in which any signal of "instantaneous" activity turns on a condition of occupancy for a period of time which is a hysteresis period. Any subsequent signal of activity restarts the hysteresis period such that nonoccupancy is not determined until activity has not been detected for a period of time greater than the "hysteresis" period. Other approaches for deciding on occupancy or nonoccupancy, such as averaging or integrating a signal of activity and providing for a decay period before switching to nonoccupancy might also be utilized by one skilled in the art.

The just described hysteresis period for "smoothing" the more instantaneous signal of activity might also be varied dependent upon the predicted level of activity in the room or conditioned space. For example, during the day when people might be expected to be active, a motion detector in a bedroom might have a short hysteresis period, which would require fairly frequent activity to "keep" the condition of occupancy triggered. At night, when low activity might be expected even when the conditioned space is occupied, then once motion or activity in the conditioned space is signaled and occupancy is known, a longer hysteresis period might be chosen which would maintain the condition of occupancy for a longer period of inactivity before the condition of nonoccupancy is again resumed.

In discussion of the illustrated embodiment of the present invention it is useful to note that there are several "levels" of activity and/or the "implication" of occupancy as might be determined by a thermostat control program which receives signals from a simple motion detector. The motion detector produces a signal which may be roughly an "instantaneous" signal of activity in the conditioned space. Hysteresis may be incorporated in the motion sensor device which retains a "smoothed" condition of activity or "occupancy" for some period of time after the motion is actually sensed. Some motion sensor devices may simply provide an instantaneous signal and the "hysteresis" effect might be incorporated by the thermostat control program. This "smoothing" by using simple hysteresis is a simplistic approach to maintaining a condition of "occupancy" given the fact that people are not always moving, and therefore may not be detectable by a motion detector. This simple smoothing of an instantaneous signal which signals "current activity" produces the "smoothed" signal which denotes "recent activity" in the conditioned space within the most recent time period of hysteresis. Then, based upon further analysis by the thermostat control program, the condition of "occupancy" may be determined.

Determination or calculation of the condition of "occupancy" may be further enhanced based upon recognition of certain recent patterns of activity in the conditioned space. It may be desirable, for example for increased comfort, for the thermostat control program to "extend" the condition of occupancy artificially for some period of time, even though no a signal of activity has not been received. This extension of occupancy may be programmed to occur only during specific periods of time. The mechanism for recognizing activity patterns or identifying a specific activity pattern from comparison to a set of possible activity patterns might also vary dependent upon time of day.

It is further noted that "user" programming of a thermostat for purposes of this discussion can be potentially done by several people or by people at different "levels" of interest. This might be true in a motel environment or in situations where many thermostats might be installed with certain desired programming parameters. For example, user input parameters or control information for a thermostat installed, or to be installed in a motel room, might be provided by the "factory" (those building the thermostat), by pre-installation programming (when several thermostats to be installed will have pre-programmed parameters), by the operators of the motel, possibly from the front desk or centralized programming facility, or by occupants, housekeeping, maintenance or others once the thermostat is installed. The term "user information" in this context is meant to include these and other similar means for providing control or program information to the thermostat apparatus and its control unit and control programming. In a similar manner a user input "screen" and "display" may be incorporated as a part of a thermostat apparatus in a single package, or as an input screen on a central control computer or in a browser screen provided by a control system.

In general, one aspect of the illustrated embodiment is to provide, during a safety period, with "relaxed" requirements to maintain a condition of occupancy with exceptions provided based upon pattern recognition analysis of activity in the conditioned space. A second aspect is to provide during a specified period of time for a method of determining, by recognizing or detecting certain patterns of activity, that extended occupancy is predicted and then no longer requiring a signal of activity in order to maintain the condition of occupancy for some specified period, with the specified period possibly dependent upon the time of day, or the desires of the user as might be provided by user programming. A third aspect of the illustrated embodiment is to provide for the user of the thermostat to provide for programming or selection of programming that affects the recognition of occupancy patterns. A fourth aspect of the illustrated embodiment is to provide for a user of a thermostat to specify periods of time during which an alternative method of occupancy determination is invoked, or to specify time periods of extended assumption of occupancy once occupancy or a pattern of occupancy has been recognized. Other similar exemplary enhancements which are further aspects of the illustrated embodiment are allowing a user to describe multiple periods of "safety" time or for choosing from alternative methods of occupancy determination selected based upon time of day or time in general such as day of week. Other similar approaches to choosing methods of occupancy detection based upon time of day or time in general could be defined by one skilled in the art as in these exemplary aspects of the illustrated embodiment.

BRIEF DESCRIPTION OF THE SEVERAL VIEWS OF THE DRAWING

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawing of which:

DETAILED DESCRIPTION OF THE INVENTION

Figure 1:
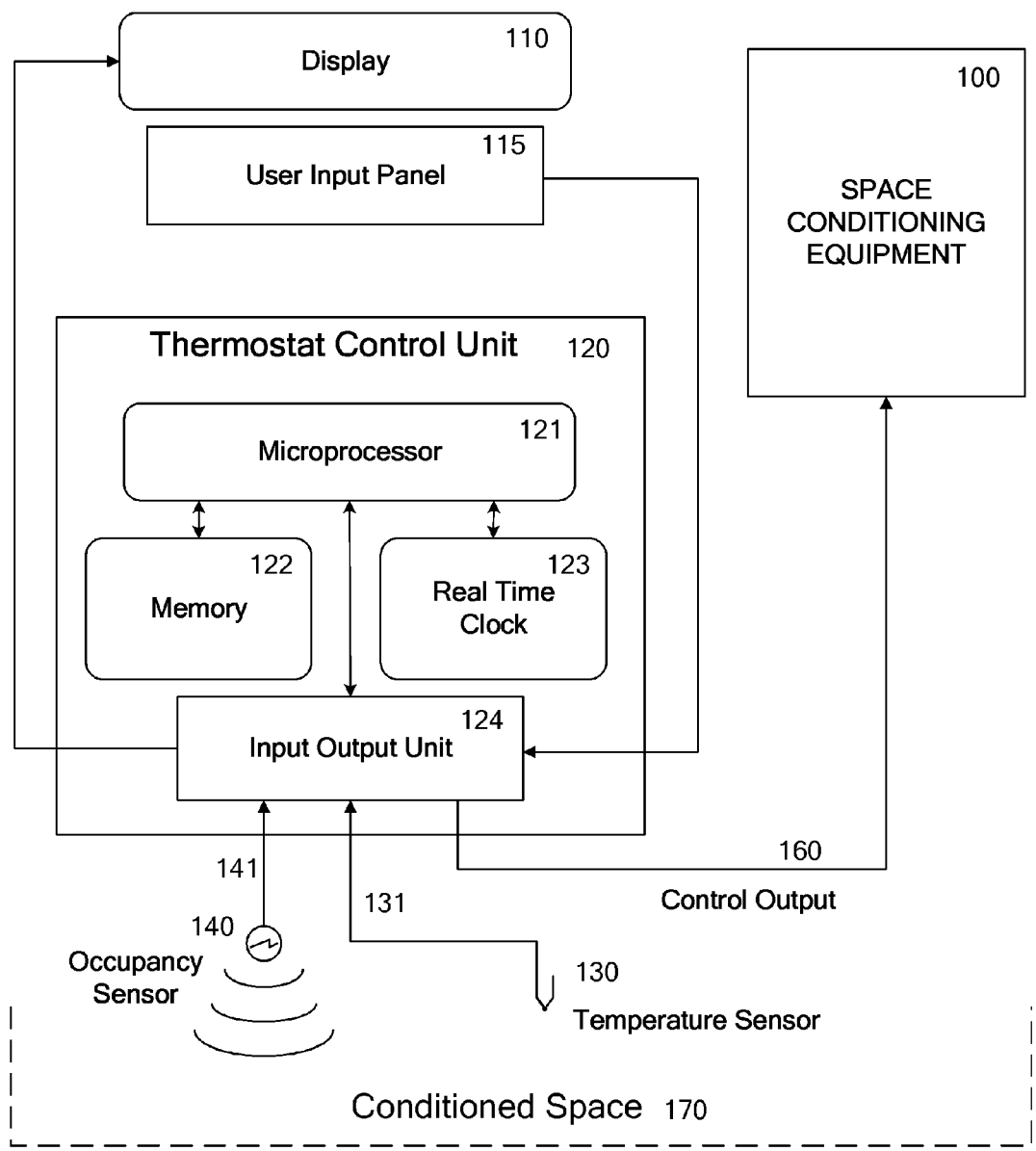
FIG. 1 is a diagram showing space conditioning equipment controlled by a programmable thermostat system which incorporates the teachings of the present invention that includes a programmable thermostat with input from a temperature sensor, a display, a user input panel for providing user input for programming, a thermostat control unit controlling operation of the thermostat system, and a motion detector serving as an occupancy detector providing an indication of occupancy to the thermostat control unit's microprocessor for the thermostat system.

An illustrated embodiment of the subject invention provides a control apparatus which may be a thermostat apparatus or other HVAC control system, which might be centralized or distributed, that incorporates an occupancy sensor and which may include also a temperature sensor, a display screen, and/or a user input mechanism. The control process of the thermostat, or the control system, provides for running a control program such as a normal event driven program that determines, typically at user programmed times, a setpoint temperature for further use by the thermostat in controlling the space conditioning equipment.

In the following discussion and description of an illustrated embodiment of the invention, the thermostat or control apparatus as described may incorporate a thermostat control program which implements some features of the invention, or a box which includes a thermostat for control of a part of an HVAC system may be controlled or take inputs that affect the control from a central HVAC control system, from a computer system, or similar control mechanisms. Other mechanisms or means for controlling, coupling, connecting or arranging the elements of the invention would be obvious to one skilled in the art and do not detract from the novelty of the present invention.

The determination of "occupancy" in a space typically relies upon use of a detector, placed in or near the space, which senses activity or motion in some range of area or space near to the detector. Activity detectors for sensing humans are often implemented using infrared sensors to detect motion. Human bodies give off heat energy in the infrared spectrum, and so a detector operating in that spectrum is useful for detecting human activity. Detectors of other types such as light sensors, light beams, sound detectors or other devices of similar nature might also be used to detect "activity" or "occupancy" depending on circumstances that might be identified by one skilled in the art.

"Activity" in a room or conditioned space, as might be signaled by an infrared motion detector, is a somewhat instantaneous indicator of "occupancy". A simple indication of activity is indicative of occupancy, but since people do not move continuously, and also because they may move out of range of the activity detector means that the activity indicator must be further processed to develop more precisely a condition which would be called "occupancy". The first and most obvious refinement is to give some hysteresis to the activity signal and call it "occupancy". This means that when a signal of activity is received, then occupancy is assumed and maintained for some defined period, with any further detection of activity causing occupancy to continue to be assumed and maintained. The hysteresis period "holds" the condition of "occupancy" until activity has not been detected for a period of time longer than the chosen "hysteresis" period. Some motion sensors have this period of hysteresis built into the electronics of the sensor itself, and some sensors allow for varying the length or time of the hysteresis or maintenance period.

Determination of occupancy based upon "activity" detection in a conditioned space can rely upon simple algorithms for determining "occupancy" utilizing simple hysteresis periods as described above, but more refined methods may improve the results and also may provide for opportunity to improve the potential for energy saving, or for increased comfort. For example, a level of activity indication which may count the number of movements detected in some recent time period may provide a thermostat control program with information that would allow the temperature setpoint to be adjusted based upon the level of activity.

Patterns of activity might also provide clues as to the type of activity or prediction as to the length of occupancy. Specific patterns of activity in a motel room might be exhibited by housecleaning personnel when compared to normal "guests" or maintenance personnel. For example, it might be expected that housecleaning personnel would have a high level of activity for some short period, then they would leave the room and there would be no activity, so a thermostat might more quickly turn off or reduce the requirements to the HVAC system as soon as it determines that housecleaning personnel have left the room.

At night, a different situation might be deemed likely. That is, a person may enter the room, move around for a short while, and then go to bed or sit in a chair and not trigger the activity indication at all, or infrequently, for some period of time. During this time the desired response of the thermostat control unit would be to recognize a pattern of activity that indicates a guest is in the room, and then to not turn off the HVAC just because no activity has been recently detected. This period of "safety" during which occupancy is "maintained" by the program, despite no or infrequent indication of activity would provide for better comfort than what would be achieved by changing the setpoint temperature too quickly because of no detected activity.

The illustrated embodiment of the present invention provides for providing different response to indication of activity dependent upon the time of day. The illustrated embodiment of the present invention further provides for recognition of patterns of activity with response to specific patterns varying depending upon the current time of day. The illustrated embodiment also further provides for identifying different patterns for recognition in which the choice of patterns to be recognized or acted upon varies dependent upon the time of day (or time of week, or month, or season).

Pattern recognition for recognizing a pattern of activity as discussed above requires choosing patterns to be recognized or identified, and consideration as to the ease of implementing in a control program a determination of a recognized pattern.

An exemplary pattern recognition technique which could be chosen as part of the illustrated embodiment of the present invention is to divide recent periods of time into sub-time periods and then look for activity, or counts of activity, in each of the sub-time periods. This provides the thermostat control program with "numbers" indicative of the length of activity, and also the level of activity in recent sub-time periods. These "numbers" can then be utilized to determine or choose a specific action in terms of modifying the setpoint temperature determined by the thermostat, or to provide for not modifying the user's desired setpoint temperature for some period of time. These choices can be made by one skilled in the state of the art. They may also be determined by user programming which provides for specifying to the thermostat control unit a desired reaction to identification of specific patterns of activity, or inactivity.

The time period chosen for pattern recognition also may have influence the pattern recognition process and is important because of the fact that motion sensors which are typically used for occupancy detection are not perfectly accurate in establishing true and completely accurate indication of occupancy. As discussed prior to this, a process or mechanism known as "hysteresis" is often built into a motion sensor to establish "occupancy" for some period after any motion is detected or signaled. The period of hysteresis might be fixed, variable, adjustable by a user, or calculated in a formula based upon "decay" of a waveform after detecting motion a multiple number of times. This hysteresis is typically for a fairly short time, maybe less than a few minutes. The hysteresis time for determining occupancy by a thermostat device which controls an HVAC system may also be set such that it is related to the cycle time desired for turning on or off the air-conditioning or heating compressor, or other HVAC device. It may be helpful in recognizing patterns of occupancy to have the period of time in which a pattern is analyzed longer than a typical hysteresis time and also long enough that a person is likely to move enough that a pattern is even noticed. Choosing a period of time for pattern recognition is not precise but in the context of the illustrated embodiment a time of fifteen minutes would be reasonable, as would times of one or two hours. The time must be long enough to allow patterns of activity to be recognized, and short enough that nonoccupancy is determined as soon as reasonably possible so that an energy saving mode of operation can be begun. The analysis of patterns of activity may also be made more general by utilizing techniques which look for more complex patterns of activity which are indicative of the type of activity in a room or space. A brief period of high activity such as when the room is being cleaned may be easily recognized by observing such activity during an exemplary period and recognizing in a general way more precisely that type of activity based upon those observations. At night examples of people sleeping and the activity they produce to an activity sensor may be observed and the characteristics determined and made recognizable. The development of such recognition capability can be done experimentally by one familiar with the state of the art in pattern recognition techniques. The pattern recognition can be made even more sophisticated by adaptive techniques, also familiar to one knowledgeable in the state of the art.

Certain aspects of the illustrated embodiment will now be described in greater detail with reference to the Figures of the Drawings. These Figures are meant to be illustrative of an aspect of the illustrated embodiment and are not meant to imply restriction on the location of components, which may be a part of a distributed system of control, a centralized system of control, or a combination of centralized and distributed control.

FIG. 1 is a diagram showing space conditioning equipment 100 controlled by a programmable thermostat system that includes a programmable thermostat with input from a temperature sensor 130, a display which might typically be a liquid crystal display 110, a user input panel 115 for providing user input for programming, a thermostat control unit 120 controlling operation of the thermostat system, and a motion detector serving as an occupancy detector 140 providing an indication of occupancy for the room in which the thermostat is mounted to the thermostat control unit's microprocessor for the thermostat system.

The space conditioning equipment 100 provides conditioned air to the room 170 which is in the conditioned space. The conditioning can be in the form of heating or cooling or with other conditioning such as for humidity. The temperature sensor 130 and the occupancy sensor 140 provide input to the thermostat control unit's input output unit 124 via connections 131 and 141 respectively.

The thermostat control unit 120 includes a microprocessor 121 for running a thermostat control program contained in memory 122, a real time clock 123, the input/output unit 124, and other devices if or as necessary to support the microprocessor 121 such as a power regulator and a timing crystal.

A display 110, which may be a liquid crystal display or other display type, serves as a mechanism for displaying various alphanumeric messages and/or icons which may be used to prompt the user for user programming and also for displaying system status, room temperature, the time of day and other items that might be of interest to the thermostat system user.

The user input panel 115 may be implemented as a touch screen detector as an attachment or as part of the liquid crystal display, with buttons for touching being displayed on the liquid crystal display. The user input panel may also be buttons or touch sensors separate from the display, and may incorporate wheels, joystick type switches, trackballs, or other types of switches and sensors for user input.

The microprogram processor of the thermostat control unit generally performs many functions as part of its programming relating to maintenance of the display, monitoring the data inputs which come from the temperature sensor, and the motion detector, and other functions or threads necessary to implement the concepts of present invention, and also in general support of the functions of the thermostat system.

The microprogram processor may have access to a real time clock 123 which is used to determine when to invoke temperature settings if those are provided as programming by the thermostat user. The real time clock may be part of the microprocessor itself, or as another device part of the thermostat control unit. The real time clock may also be settable by the microprocessor. The real time clock may also be part of a centralized control system, and is illustrated in this figure as part of the thermostat unit only for exemplary purposes. A real time clock is commonly provided in thermostat apparatus of the prior art and may be utilized in application of the present invention, but real time information is not necessarily required to achieve the present invention in some of its aspects. Alternative approaches which either utilize or do not utilize a real time clock as part of the thermostat apparatus, such as with a centralized control, may be devised by one skilled in the art.

The occupancy sensor device 140 and temperature sensor device 130 in one embodiment are contained within the housing of the thermostat system. In another illustrated embodiment either of these devices may be located external to the thermostat system with connections 141 and 131 respectively to the thermostat control unit.

If multiple occupancy sensors are in use, then a connection from each occupancy sensor to the thermostat control unit is provided. The connection of occupancy sensors can be by wire, by RF signal, or other wireless signal. The temperature sensor connection would typically be connected by wiring but could also be wireless if desired.

In this FIG. 1 illustration, the thermostat control unit sends signals over a wire 160 to the space conditioning equipment as control for the equipment. The thermostat control unit causes the space conditioning equipment to turn on heating or cooling to the conditioned space. The signal wire 160 might be replaced by a wireless type signal if desired.

Figure 2:
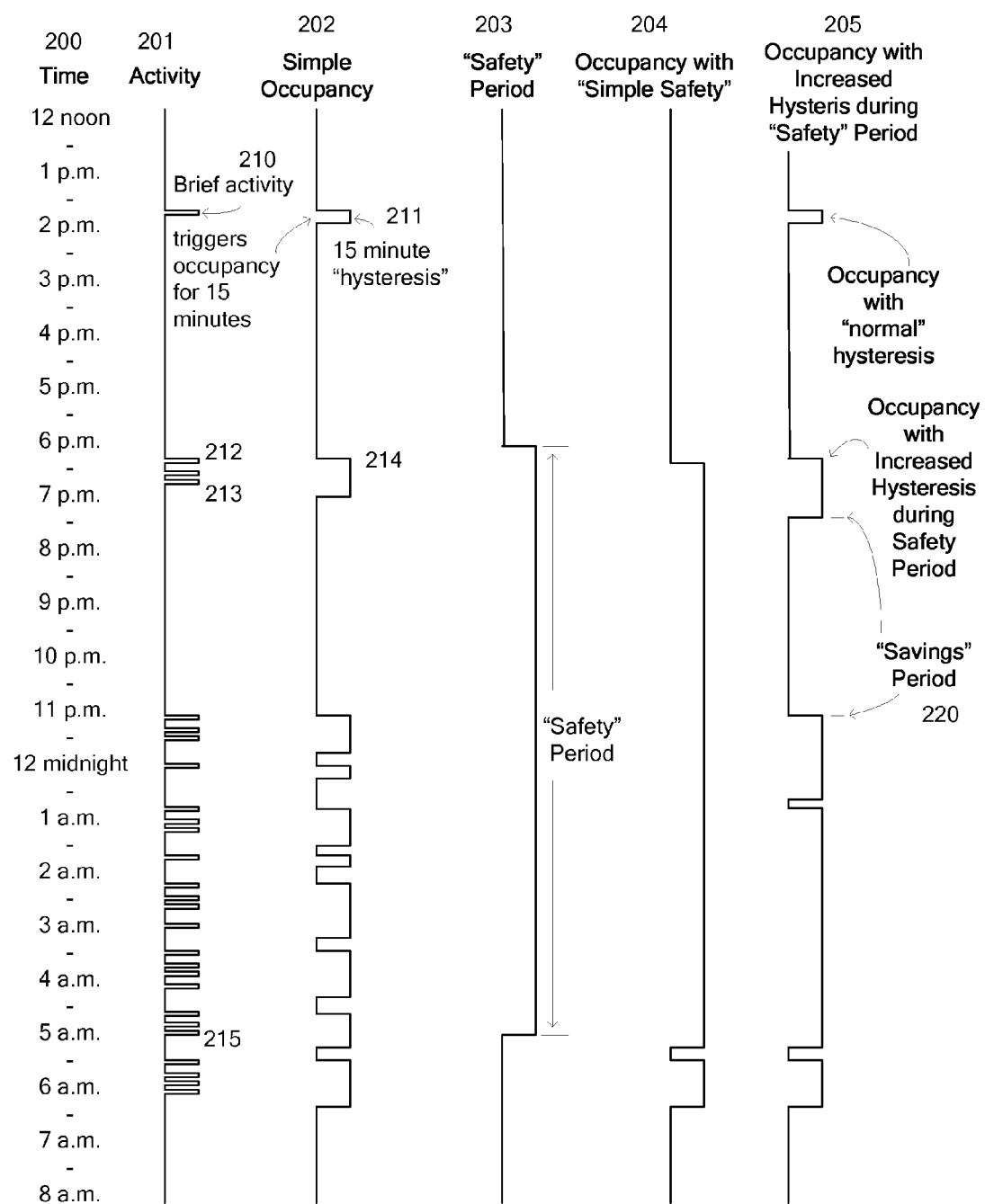
FIG. 2 is a diagram showing activity in a conditioned space that might occur in a typical motel room throughout a day with the exemplary activity pattern selected to illustrate potential energy savings.

FIG. 2 is a diagram showing activity 201 in a conditioned space that might occur in a typical motel room throughout a day as indicated by a vertical time line 200 with the exemplary activity pattern 201 determined to illustrate potential energy savings. The time line 200 and the adjacent activity line 201 illustrate a period of time from noon, 12:00 p.m. until 8:00 a.m. the next day. The first indication of activity 210 is at approximately 1:45 p.m. and triggers an indication of simple occupancy on the Simple Occupancy line 202 at the same time. A 15 minute hysteresis is defined such that the somewhat instantaneous indication of activity 210 triggers a 15 minute period 211 of "simple occupancy" which extends until approximately 2:00 p.m.

In similar manner, more activity 212 is illustrated as beginning at 6:10 p.m. with three detected pulses of activity, with the last being at approximately 6:45 p.m. The second indication of simple occupancy 214 thus begins with the pulse of activity 212 at 6:10 p.m. and ends at 7:00 p.m. which is fifteen minutes after the third recent pulse of activity at 213 at 6:45 p.m.

FIG. 2 provides further illustration of "simple occupancy" throughout the day as can be seen by examining the time line 200, the activity line 201 and the corresponding simple occupancy line 202.

A "safety period" illustrated by a safety period line 203 shows a period of time beginning at approximately 6:00 p.m. and ending at approximately 5:00 a.m. the next day. A resultant "occupancy with simple safety" line 204 illustrates occupancy that, once started, is "maintained" throughout the safety period until 5:00 a.m. The occupancy is first triggered by the activity signal 212 at 6:10 p.m. and then is "maintained" because of the defined safety period until 5:00 a.m. and then further remains in the "occupied" state until just after 5:00 a.m. which is 15 minutes after the most recent activity 215 just before 5:00 a.m.

In illustration of an aspect of the illustrated embodiment FIG. 2 has on the right, labeled "Occupancy with Increased Hysteresis during Safety Period" 205 a line illustrating varying the response to detection of activity depending on the time of day. In the illustration, the Safety Period 204 is from 6:00 p.m. until 5:00 a.m. the next day. A calculated condition of occupancy is shown in line 205 which varies in determination based upon whether the current time of day is within the defined Safety Period or not. In the illustration, from 12 noon until 6:00 p.m. indication of activity triggers "maintenance" of a calculated condition of occupancy for a "normal" hysteresis period of fifteen minutes. After 6:00 p.m. and until the end of the Safety Period, indication of activity triggers "maintenance" of a calculated condition of occupancy for an altered hysteresis time of approximately one hour.

It can be noted on the same "Occupancy with Increased Hysteresis during Safety Period" that this approach results in a "Savings Period" 220 of potential saving of energy in comparison to the more simple approach illustrated on the line "Occupancy with Simple Safety" 204. From approximately 7:00 p.m. until activity is detected at 11:00 p.m. the HVAC unit may be operated in an energy savings mode that would be provided by assuming no occupancy during that time period. This happens even though the increased hysteresis in converting activity to occupancy has allowed for less activity to still maintain the condition of occupancy in comparison to a "normal" part of the day, where shorter hysteresis is utilized. Varying, depending on time, either the method of detecting, or the response/method of maintaining a calculated condition of occupancy can provide for better comfort or increased opportunity during certain time periods for energy saving.

Figure 3:
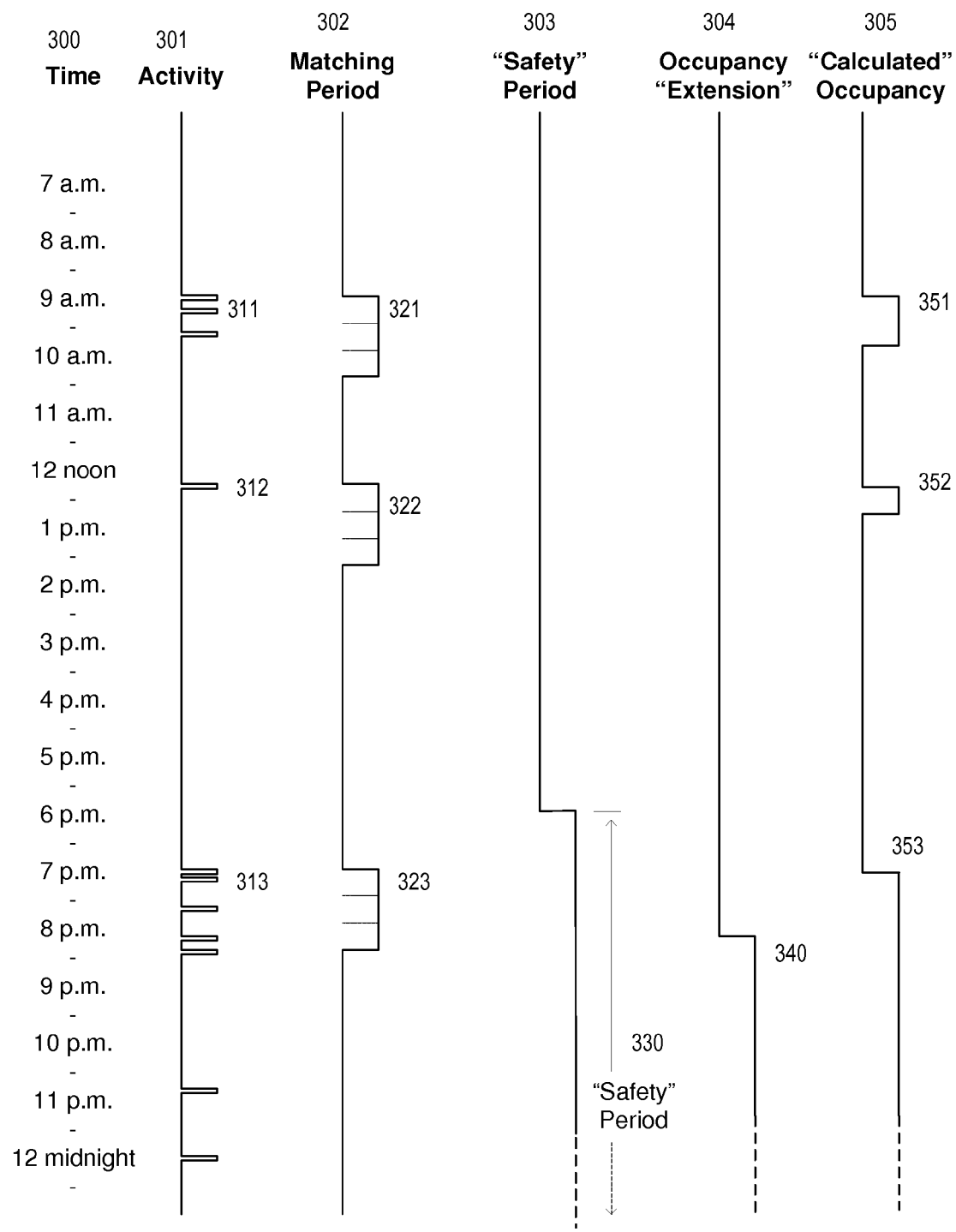
FIG. 3 is a diagram illustrating an exemplary pattern recognition methodology from the illustrated embodiment of the invention in which patterns of activity are identified as being "recognized" when any activity occurs during some selected number of sub-periods of a longer time period. Specific patterns of occupancy such as this are recognized and then trigger modifications to "normal" thermostat control program activity such as to selectively provide for better "comfort", more energy savings, reduced "cycling" of an HVAC unit, or other optimizations in HVAC control.

FIG. 3 is a diagram illustrating an exemplary pattern recognition methodology from the illustrated embodiment of the invention in which patterns of activity are identified as being "recognized" when any activity occurs during some selected number of sub-periods of a longer time period. In FIG. 3, an exemplary pattern of activity is shown on the line labeled "Activity" 301 which is adjacent to the "Time" line 300. A "matching period" of time is chosen for pattern recognition purposes which is about one and one-half hours long, as shown on the "Matching Period" line 302 with three matching periods shown 321 322 323. In the illustration, the matching periods are divided into three sub-periods, and the pattern recognition "looks" for an occurrence of activity in three adjacent (congruent) sub-time periods. The first period of activity 311 begins at about 9:00 a.m. and triggers the beginning of the first matching period 321. In this example, the activity might be a housecleaning person someone walking into a motel room, going into the bathroom to clean where he or she is not detected by the activity sensor for a few minutes, stepping out into the main part of the motel room for a minute and then exiting the room to grab some mints, returning in a few minutes and putting the mints on the pillow and then leaving the room. Three instances of activity are signaled, and since they occur across only two of the three sub-periods, the choice for this illustrated embodiment is to utilize "normal" occupancy hysteresis and therefore the calculated occupancy 351 returns quickly to the unoccupied state.

Continuing with reference to FIG. 3 as further example of the illustrated embodiment, later in the day at approximately noon activity 312 is detected (maybe because someone enters the room just to be sure that it was cleaned) and leaves again quickly. The initial activity causes calculated occupancy to be triggered, but since there is no further activity and specifically there is no activity in the second two sub-time periods of the matching period 322, calculated occupancy 352 returns shortly to the unoccupied state.

At 6:00 p.m. a "safety period" 330 begins as shown on the "Safety Period" line 303. At 7:00 p.m. several indications of activity 313 occur which span three sub-periods of the matching period 323. This triggers Occupancy Extension 340 as shown on the Occupancy Extension line 304 beginning as soon as activity is detected in the third sub-time period of matching period 323 which is at approximately 8:10 p.m. The occupancy extension, in this example, causes the calculated occupancy 305 at 7:00 p.m. 353 to be set to the occupied state until the safety period ceases, which is off the chart in this example illustration.

It is specifically noted that the occupancy extension as described and discussed with regards to the present invention is an extension of the condition of occupancy beyond the effect of any "hysteresis" period as already previously discussed, hysteresis typically being a simple "smoothing" of a current activity signal from a current activity sensor. The step or mechanism for occupancy extension as part of the present invention is typically intended to provide for longer periods of a calculated condition of occupancy than would typically occur as a result of a "hysteresis" effect, which in the prior art would typically be a short period of time for example a minute, or possibly a slightly longer period of time that allows for cycling of the HVAC equipment, such as five minutes or ten minutes.

Energy reduction in operation of an HVAC system can be effected in many ways which can be defined by one skilled in the art. Within the illustrated embodiment of the present invention energy reduction can be achieved during periods of nonoccupancy in many ways. As discussed, one such approach would be to have the user provide a desired setpoint temperature intended for use during periods where occupancy is not calculated. Another approach would be to raise or lower the setpoint temperature by some fixed or calculated from a user's normally desired "occupied" setting, that is, raising it in cooling mode and lowering it in heating mode to try and save energy. Another approach would be to simply turn the HVAC completely off, or to allow alternative sensors for prevention of freezing to take over control. Delta changes to the setpoint by a percentage, changes by a fixed value, and changes programmed by a user are exemplary methods to determine an alternative setpoint temperature when it is determined the conditioned space is to be considered unoccupied.

It is also noted in the above discussion and in the following claims that terms such as microprocessor are not meant to be limiting to certain small devices or types of processors. In similar manner, an occupancy sensor as described is meant to describe a device with motion detection or other similar means for detecting activity or occupancy. The apparatus described may be implemented within a single box, a small number of boxes with connections or means of coupling between them, or the apparatus and functionality of the apparatus may be distributed throughout a small or large control system, possibly under centralized control.

Thus, while the principles of the invention have now been made clear in an illustrative embodiment, there will be immediately obvious to those skilled in the art many modifications of concepts, structure, arrangements, the elements, circuitry, materials, and components, used in the practice of the invention which are particularly adapted for specific environments and operating requirements without departing from those the spirit and scope of the invention as defined by the following claims. The embodiments of the invention should not be limited to the disclosed embodiments but rather should be limited by the spirit and scope of the following claims.

What is claimed is:

1. A control apparatus for controlling space conditioning equipment serving a conditioned space, the apparatus comprising:
   a thermostat control unit, which includes a processor, and a computer memory, running under control of a thermostat control program component;
   a temperature sensor coupled to the thermostat control unit for providing a signal indicative of current temperature in the conditioned space;
   an occupancy sensor coupled to the thermostat control unit generating a signal indicative of current activity in the conditioned space;
   a user input mechanism to establish a user desired occupied conditioned space setpoint temperature;
   the thermostat control program component including instructions defining logic and related data stored in the computer memory, the instructions defining logic and related data including:
   A) instructions for monitoring the signal indicative of current activity and defining an operating sequence to establish a condition of actual occupancy, and to recognize within a recent time interval a pattern of activity described by a timing of a plurality of the signals indicative of current activity and received within that recent time interval;
B) instructions for initiating a condition of occupancy extension upon recognition of the pattern of activity, and maintaining that condition over an extension time period;
C) instructions for forming and maintaining a calculated condition of occupancy which is deemed valid only during the condition of actual occupancy or the condition of occupancy extension;
D) instructions to signal the space conditioning equipment, when the condition of occupancy extension exists, such as to bring the current temperature in the conditioned space closer to the user desired occupied conditioned space temperature,
and in the absence of the condition of occupancy extension, to operate so as to reduce energy usage by the space conditioning equipment.

2. The control apparatus of claim 1, in which the pattern of activity spans an interval of time longer than fifteen minutes.

3. The control apparatus of claim 1, in which the recent time interval utilized during recognition of the pattern of activity is more than thirty minutes and less than two hours.

4. The control apparatus of claim 1 in which the extension time period extends at least thirty minutes beyond the end of the condition of actual occupancy.

5. The control apparatus of claim 1 which further includes a real time clock providing at least current time of day information to the thermostat control program, and the extension time period is determined utilizing the current time of day information.

6. The control apparatus of claim 1 which includes further a real time clock providing at least current time of day information to the thermostat control program, and in which upon detecting the pattern of activity, the thermostat control program component extends in time the calculated condition of occupancy for an extension period which is selected from a set of possible extension time periods with selection based upon the current time of day information.

7. The control apparatus of claim 1 in which the operating sequence to recognize the pattern of activity includes:
A) defining a time period for pattern matching that spans greater than 10 minutes;
B) sub-dividing the time period for pattern matching into a plurality of sub-time periods;
C) checking for activity in a selected number of sub-time periods, with the selected number being more than one but not necessarily all of the sub-time periods, and identifying the recognized pattern of activity when activity is detected in at least said selected number of sub-time periods.

8. The control apparatus of claim 7 in which the operating sequence to recognize the pattern of activity further requires that the selected number of sub-time periods be congruent.

9. The control apparatus of claim 7 in which the operating sequence to recognize the pattern of activity is further based upon a count of number of occurrences of the signal indicative of current activity.

10. The control apparatus of claim 7 in which the operating sequence to recognize the pattern of activity is further based upon a count of a number of occurrences of the signal indicative of current activity in a plurality of the sub-time periods.

11. A control apparatus for controlling space conditioning equipment serving a conditioned space, the apparatus comprising a thermostat control unit, which includes a microprocessor and computer memory, running under control of a thermostat control program component;
a temperature sensor coupled to the thermostat control unit for providing a signal indicative of current temperature in the conditioned space;
an occupancy sensor coupled to the thermostat control unit generating a signal indicative of current activity in the conditioned space;
a user input mechanism to establish a user desired occupied conditioned space setpoint temperature and a user desired unoccupied conditioned space setpoint temperature;
the thermostat control program component including instructions defining logic and related data stored in the computer memory and being operative with:
A) instructions for monitoring the signal indicative of current activity to establish a condition of actual occupancy, and to recognize within a recent time interval a pattern of activity described by a timing of a plurality of the signals indicative of current activity and received in that recent time interval;
B) instructions for initiating a condition of occupancy extension upon recognition of the pattern of activity, and maintaining that condition over an extension time period;
C) instructions for forming and maintaining a calculated condition of occupancy which is deemed valid only during the condition of actual occupancy or the condition of occupancy extension;
D) instructions to establish a user's currently desired conditioned space temperature by selecting, based upon the calculated condition of occupancy, from either a) the user desired unoccupied conditioned space setpoint temperature, or, b) the user desired occupied conditioned space setpoint temperature and to signal the space conditioning equipment to operate so as to bring the current temperature in the conditioned space closer to the user's currently desired conditioned space temperature.

12. A method for operating a control apparatus for controlling space conditioning equipment serving a conditioned space, the apparatus comprising
a thermostat control unit, which includes a processor, and a computer memory, running under control of a thermostat control program component;
a temperature sensor coupled to the thermostat control unit for providing a signal indicative of current temperature in the conditioned space;
an occupancy sensor coupled to the thermostat control unit generating a signal indicative of current activity in the conditioned space;
a user input mechanism to establish a user desired occupied conditioned space setpoint temperature;
the thermostat control unit following steps for:
A) monitoring the signal indicative of current activity and
1) based upon that signal establishing a condition of actual occupancy; and
2) recognizing within a recent time interval a pattern of activity described by a timing of a plurality of the signals indicative of current activity received in that recent time interval;
B) upon recognition of the pattern of activity, initiating a condition of occupancy extension, and maintaining that condition over an extension time period;

C) forming and maintaining a calculated condition of occupancy which is deemed valid only during the condition of actual occupancy or the condition of occupancy extension;

D) when the condition of occupancy extension exists, operating in a mode of normal energy usage and signaling the space conditioning equipment such as to bring the current temperature in the conditioned space closer to the user desired occupied conditioned space temperature, and in the absence of the condition of occupancy extension, operating in a mode for reduced energy usage in comparison to the energy expected to be used during the mode of normal energy usage.

13. A control apparatus for controlling space conditioning equipment serving a conditioned space, the apparatus comprising a thermostat control unit, which includes a microprocessor and computer memory, running under control of a thermostat control program component;

a temperature sensor coupled to the thermostat control unit for providing a signal indicative of current temperature in the conditioned space;

an occupancy sensor coupled to the thermostat control unit generating a signal indicative of current activity in the conditioned space;

a user input mechanism to establish a user desired occupied conditioned space setpoint temperature and a user desired unoccupied conditioned space setpoint temperature;

the thermostat control program component including instructions defining logic and related data stored in the computer memory and being operative with:

A) instructions for monitoring the signal indicative of current activity to establish a condition of actual occupancy, and to determine within a recent time interval a pattern of activity described by a timing of a plurality of the signals indicative of current activity and received in that recent time interval;

B) instructions for initiating a condition of occupancy extension upon analysis of the pattern of activity, and maintaining that condition over an extension time period;

C) instructions for forming and maintaining a calculated condition of occupancy which is deemed valid only during the condition of actual occupancy or the condition of occupancy extension;

D) instructions to establish a user's currently desired conditioned space temperature by selecting, based upon the calculated condition of occupancy, from either a) the user desired unoccupied conditioned space setpoint temperature, or, b) the user desired occupied conditioned space setpoint temperature and to signal the space conditioning equipment to operate so as to bring the current temperature in the conditioned space closer to the user's currently desired conditioned space temperature.

14. The control apparatus of claim 13 which further includes a real time clock providing at least current time of day information to the thermostat control program, and in which the initiating of the condition of occupancy extension is disabled during certain times of day based upon the current time of day information.

15. The control apparatus of claim 13 which further includes a real time clock providing at least current time of day information to the thermostat control program, and in which the initiating of the condition of occupancy extension is disabled during certain times of day based upon the current time of day information, with further user input from the user input mechanism providing specific times of day for disabling the condition of occupancy extension.

16. The control apparatus of claim 13 which includes further a real time clock providing at least current time of day information to the thermostat control program, and in which upon detecting the pattern of activity, the thermostat control program component extends in time the calculated condition of occupancy for an extension period which is selected from a set of possible extension time periods with selection based upon the current time of day information.

17. A control apparatus for controlling space conditioning equipment serving a conditioned space, the apparatus comprising a thermostat control unit, which includes a microprocessor and computer memory, running under control of a thermostat control program component;

a temperature sensor coupled to the thermostat control unit for providing a signal indicative of current temperature in the conditioned space;

an occupancy sensor coupled to the thermostat control unit generating a signal indicative of current activity in the conditioned space;

a user input mechanism to establish a user desired occupied conditioned space setpoint temperature and a user desired unoccupied conditioned space setpoint temperature;

the thermostat control program component including instructions defining logic and related data stored in the computer memory and being operative with:

A) instructions for monitoring the signal indicative of current activity to establish a condition of actual occupancy, and to determine, within a recent time interval, patterns of activity, each pattern described by a timing of a plurality of the signals indicative of current activity and received in that recent time interval;

B) instructions for initiating a condition of occupancy extension upon identification of at least one pattern of activity, and maintaining that condition over an extension time period;

C) instructions for forming and maintaining a calculated condition of occupancy which is deemed valid only during the condition of actual occupancy or the condition of occupancy extension;

D) instructions to establish a user's currently desired conditioned space temperature by selecting, based upon the calculated condition of occupancy, from either a) the user desired unoccupied conditioned space setpoint temperature, or, b) the user desired occupied conditioned space setpoint temperature and to signal the space conditioning equipment to operate so as to bring the current temperature in the conditioned space closer to the user's currently desired conditioned space temperature.

* * * * *